United States Patent Office 3,433,130
Patented Mar. 18, 1969

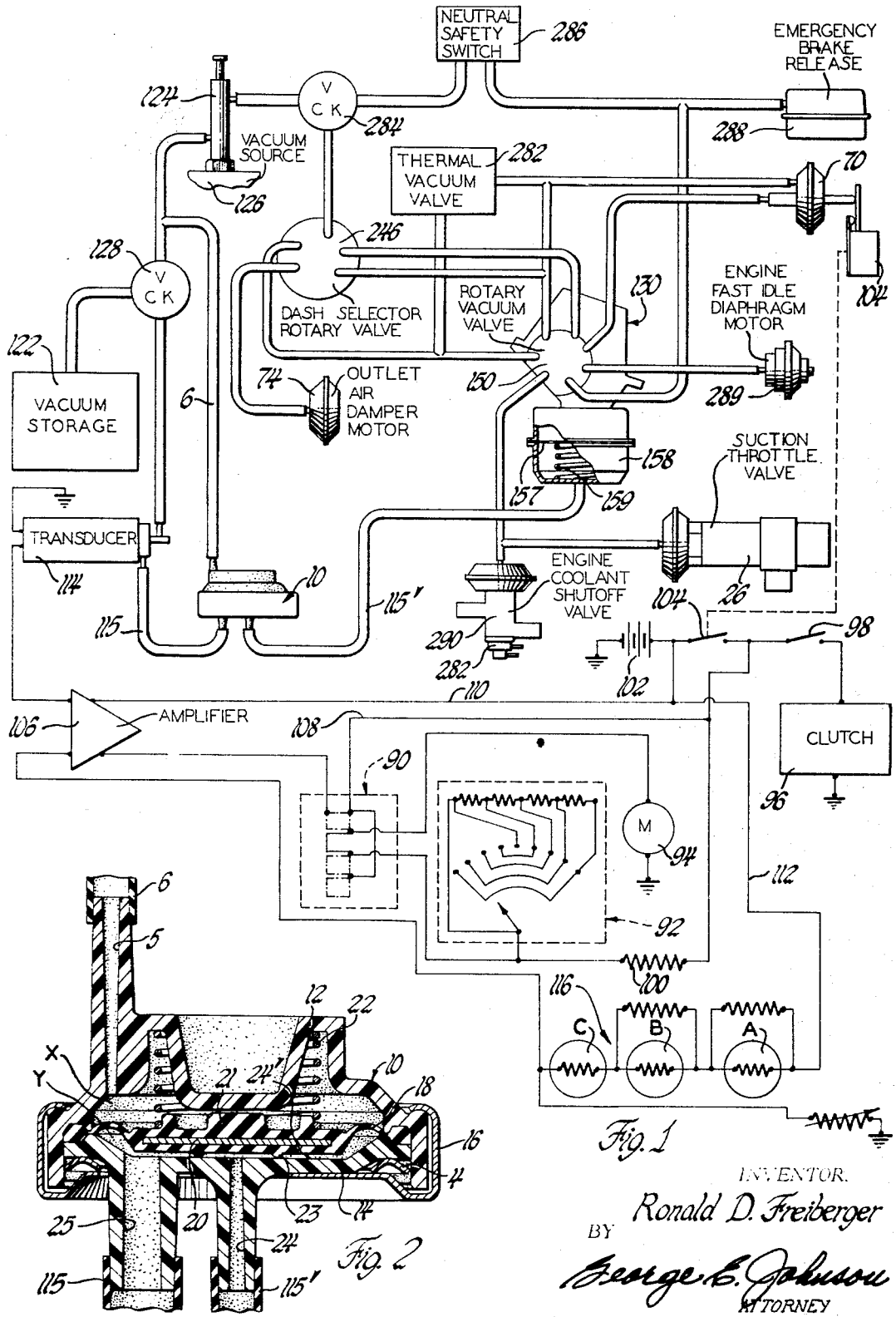

3,433,130
AUTOMOTIVE COMFORT CONTROL SYSTEM
WITH VACUUM HOLD
Ronald D. Freiberger, Kokomo, Ind., assignor to General Motors Corporation, Detroit, Mich., a corporation of Delaware
Filed June 23, 1966, Ser. No. 559,874
U.S. Cl. 91—447   1 Claim
Int. Cl. F15b 13/042; B60h 1/00; F16k 7/17

ABSTRACT OF THE DISCLOSURE

This invention relates to a vacuum system for automatically controlling a condition such as temperature existent in an automobile passenger compartment and more particularly to a system in which a regulated vacuum is maintained to stablize the control despite interruptions in the supply of raw vacuum which would otherwise occasionally effect extreme or unpleasant side results in the system operation.

Background of the invention

The present invention is an improvement over the automotive comfort control system described in the U.S. patent application Ser. No. 322,491 filed Nov. 8, 1963 in the names of G. M. Gaskill, W. H. Kolbe, T. A. Prewitt and E. W. Yott. This prior system has proven itself very satisfactory but if the car or system involved is shut down and the engine ignition is turned off, the heating, ventilating and air conditioning system is automatically actuated to extremes of operation—i.e.—the system becomes adjusted to a maximum heating position by way of example, and when restarted shortly thereafter, the heater can pump a great deal of heat into the passenger compartment before a proper control is reestablished automatically. Such an effect is unpleasant to the passengers. If the car is not operated for an hour or more, leakage normally associated with vacuum operated system elements may also allow controls to relax to maximum air conditioning positions. On restart, blasts of cold air may occur necessitating manual adjustment while the uncomfortable situation manual adjustautomatic vacuum control is stabilized.

Description of the invention

In the drawings:
FIGURE 1 is a diagrammatic view of a vacuum operated system adapted to obtain a selected positioning of controls including valves and switches in a heating, ventilating and air conditioning system for an automobile—an electrical system for detecting a change in condition and accordingly operating the vacuum system being also illustrated; and
FIGURE 2 is an enlarged cross-sectional view of a vacuum control valve utilized in the system of FIGURE 1.

The above mentioned U.S. patent application Ser. No. 322,491 describes a complete system as installed in an automobile and the present FIGURES 1 and 2 depict a change or improvement in that system so the description herein pertains specifically to the vacuum system and a special valve installed therein for the realization of the improvement. Only a general description of the over-all controls is set forth herein as being essential for a clear understanding of the invention.

In FIGURE 1, a switch arrangement 90 and a circuit board 92 are shown for serving a motor 94. The latter controls a blower for forcing air into a passenger compartment. A clutch 96 is provided for actuating an air conditioning system compressor and that clutch is controlled by an ambient temperature switch 98 and a "time delay" switch 104. A resistor 100 is in series with the blower motor 94 to provide a second level of blower speeds. A battery 102 is connected to the switch arrangement 90 through the switch 104. An amplifier 106 is arranged to receive current from the battery 102 and is connected by lines 108, 110, and 112 to the switch arrangement 90, a transducer 114, and a temperature sensor system 116 respectively. The latter includes an ambient air temperature thermistor A, a duct outlet temperature thermistor B, and a dash-mounted in-car temperature thermistor C. A, B, and C are connected in series and this total sensing resistance influences the amplifier 106 which in turn causes a transducer 114 to perform its function—to regulate vacuum in a line 115 in accordance with a temperature variation sensed at 116. Crude vacuum is received from the engine intake manifold 126 through a check valve 128 and from a reserve or storage tank 122.

An air-mix damper (not shown) is operated from a power assembly generally indicated at 130 and operated by a main vacuum motor 158. Associated with the power assembly 130 is a rotary vacuum valve 150 having seven ports whereby programming in accordance with conditions may be had. A suction throttling valve 26 controls flow of refrigerant at the discharge of an evaporator (not shown). A vacuum motor 70 is provided for operating a damper (not shown) as well as the "time-delay" switch 104. A motor 74 is provided to control an outlet air damper (not shown) and there is a crude vacuum storage tank 122 for receiving vacuum from the fitting 124 by way of a check valve 128. A dash-mounted rotary selector valve 246 receives raw vacuum through a check valve 284. Valve 246 has five ports, one of which is connected to the motor 74. Crude or raw vacuum also goes to the valve 150 and a thermal vacuum valve 282. A neutral safety switch 286 is connected between the check valve 284 and a brake release motor 288. An engine fast idle diaphragm motor 289 is controlled from the assembly 130. A coolant shut-off valve 290 is operated by the rotary vacuum valve 150. The thermal vacuum valve 282 is shown twice in the drawing merely to avoid confusion.

The matter thus far described is shown in the U.S. patent application Ser. No. 322,491 above referred to. The present invention includes the provision of a control valve 10 introduced into the line 115–115' connecting the transducer 114 to the main vacuum motor 158 which is in a modulated portion of the system.

The valve 10 has two body portions 12 and 14 retained together by means of a clamping ring 16 with a flexible diaphragm 18 interposed between the two bodies. The diaphragm 18 includes a central stiffening disk 20 molded within the diaphragm material. A central stop projection 21 on the diaphragm is adapted to abut a depending part of the body portion 12. A spring 22 acts between the latter and the diaphragm 18 urging an annular seat 23 on the latter toward a surface 24' surrounding a passage 24 in the body portion 14. A second and larger port 25 is provided outside the annular seat 23. A spring washer 4 aids in tightly retaining the circular margin of the diaphragm between the body portions 12 and 14. The diaphragm 18 separates the valve interior into two chambers X and Y with the chamber X enclosing the spring 22 and having a port 5 connected by a line 6 to the crude vacuum source. When the diaphragm 18 is raised, the other chamber Y plus the two ports 25 and 24 constitute a flow passage for regulated vacuum to the motor 158.

The spring 22 is given a predetermined loading so that the diaphragm 18 seats to close off the port 24 until the raw vacuum in line 6 and chamber X exceeds the regulated vacuum in chamber Y. The vacuum in motor 158 cannot fall below the vacuum in chamber Y and if the chamber Y drops, a diaphragm 157 in the motor 158 will "lock" in position and "hold" against the force of a spring 159 in accordance with the conditions obtaining when the port 24 is closed.

Much of the system shown in FIGURE 1 pertains to "on-off" devices and, although the presence of a storage tank 122 is sometimes preferred there is often no need for such a tank with those devices. As for the modulating or proportioning part of the system in which temperature obtained in a passenger compartment relies on intermediate positions of a damper, etc. (as distinguished from "on-off" the locking off of the modulating part, in some cases, avoids the necessity for the storage tank 122 completely.

If the crude vacuum supply drops off unduly the diaphragm of the motor 158 will be held in its already attained position and, upon restarting, the operation and the results are more pleasant to the vehicle passengers. Engine manifold vacuum varies erratically in an automobile, and in some mountainous areas, the availability is nil for as much as twenty minutes during a hill climb. Because of small leaks, it is difficult to store enough vacuum to maintain system operation. The control valve 10 compares regulated vacuum (line 115–115') to manifold vacuum 126, and when the supply level drops below demand, it interrupts the modulation and "holds" the level of operation of the modulated components until the vacuum supply is reestablished. Since control points are very steady during normal operation, this compromise is desirable.

It will be appreciated that vacuum motors such as shown at 158, 74, 289, etc. are of the type that utilize the vacuum to overcome the force of a spring. The motors of the "on-off" type use springs which need no specific calibration whereas the spring 159 used in the motor 158 of the modulated portion of the system has a calibrated loading.

I claim:
1. An automotive comfort control system comprising an engine intake manifold defining a raw vacuum supply produced when the automobile ignition is energized; transducer means connected to said intake manifold raw vacuum supply including means to mix atmospheric air with intake manifold vacuum when the automobile ignition is energized; said transducer means producing a regulated vacuum varying in accordance with temperature and automobile intake manifold conditions and being operative only during the period when the automobile ignition is energized; check valve means between said raw vacuum supply and said transducer means to retard movement of air from said raw vacuum supply to said transducer means; a vacuum storage means between said check valve and said transducer means; a motor arranged to be actuated by said regulated vacuum for operating controls to counteract a variation in said temperature; a control valve independent of said transducer means having a body with a diaphragm separating the interior of said body into two chambers; said diaphragm having first and second control positions, the first of said positions being attained when the automobile ignition is deenergized, and being imperforate to seal said chambers from each other at all times and during all phases of operation of said transducer means; one of said chambers including spring means biasing said diaphragm into the other chamber when in said first control position; said one chamber having a supply port being connected to said raw vacuum supply between said engine intake manifold and upstream of said check valve for communication with the raw vacuum supply; a stop member on said diaphragm coacting with said valve body when said diaphragm is in its second control position to limit travel of the diaphragm into said one chamber to maintain constant communication between said raw vacuum supply port and said one chamber, said port being continuously open to said one chamber and said raw vacuum supply; the said other chamber having a first port and a second port; said first port communicating said other chamber with said transducer means; said second port communicating said other chamber with said motor; said first port and said second port being serially connected with said other chamber and with one another to define a flow passage for said regulated vacuum from said transducer means to said motor; said flow passageway being open when said diaphragm is in its second control position; said diaphragm separating said flow passage from said one of said chambers at all times to separate raw vacuum from regulated vacuum; a portion of said diaphragm being arranged to close off said second port when urged into its first control position by said spring means; said diaphragm traveling into said other chamber and into said first control position when the regulated vacuum within the other chamber exceeds the raw vacuum within the one chamber and being operative when the ignition is deenergized to immediately close off said second port and thereby block communication between said transducer means and said motor; both of said ports communicating with the side of said diaphragm opposite said one chamber when said second port is either closed or open; said diaphragm being held by said spring means in its first control position to close said second port until raw vacuum in said one chamber exceeds regulated vacuum in said other chamber.

References Cited

UNITED STATES PATENTS

| | | | |
|---|---|---|---|
| 3,354,902 | 1/1967 | Obermaier | 137—496 |
| 3,073,345 | 1/1963 | Hagler | 91—459 |
| 2,587,375 | 2/1952 | Paulsen | 137—510 |
| 3,263,739 | 8/1966 | Gaskill | 165—23 |

MARTIN P. SCHWADRON, *Primary Examiner.*

U.S. Cl. X.R.

137—496; 235—61.11; 237—8, 12.3

UNITED STATES PATENT OFFICE
CERTIFICATE OF CORRECTION

Patent No. 3,433,130            March 18, 1969

Ronald D. Freiberger

It is certified that error appears in the above identified patent and that said Letters Patent are hereby corrected as shown below:

Column 1, line 17, "stablize" should read -- stabilize --; line 44, "manual adjust-" should read -- exists and until --. Column 4, line 49, "1/1967" should read -- 11/1967 --.

Signed and sealed this 14th day of April 1970.

(SEAL)
Attest:

Edward M. Fletcher, Jr.          WILLIAM E. SCHUYLER, JR.
Attesting Officer                     Commissioner of Patents